Feb. 27, 1962 H. A. TOULMIN, JR 3,022,607
SOUND DEADENING TILE
Filed Dec. 1, 1953

INVENTOR.
Harry A. Toulmin Jr.
BY Toulmin & Toulmin
ATTORNEYS

United States Patent Office 3,022,607
Patented Feb. 27, 1962

3,022,607
SOUND DEADENING TILE
Harry A. Toulmin, Jr., Dayton, Ohio, assignor to The Commonwealth Engineering Company of Ohio, Dayton, Ohio, a corporation of Ohio
Filed Dec. 1, 1953, Ser. No. 395,469
6 Claims. (Cl. 50—101)

This invention relates to a sound-deadening tile member, more particularly to an apertured ceramic tile having a fibrous glass filler, which may easily be mounted on a wall surface.

An inherent characteristic of ceramic tiles is that they have virtually no sound-insulating qualities. Consequently walls which have a covering of ceramic tiles are unable to absorb sound waves, and the sound waves merely rebound from the ceramic surfaces. It has been deemed desirable to have a ceramic surface which would absorb sound waves in order to quiet the room containing these surfaces. For example, a shower room or a steam bath room would be structures where a ceramic tile surface would be desirable but where it would also be desirable to insulate to some degree the sounds emanating therein. It would also be desirable to provide these surfaces with sound-insulating material which could be quickly and cheaply installed.

This invention provides ceramic tile which has sound-insulating qualities and may be easily installed. The ceramic tile member of this invention would enable many rooms, wherein it was desired to have ceramic surfaces, to be soundproof to a greater degree than heretofore possible. In addition, these sound-deadening tile members are so constructed that they are easy to mount on a surface.

The ceramic tile member of this invention comprises a fibrous glass mat which has a ceramic layer on the outer surface thereof. The other surface of the fibrous glass mat has a suitable adhesive backing so that the tile members may be quickly bonded to a surface. The ceramic layer has a plurality of apertures therein. In one embodiment of the invention the fibrous glass mat has apertures therein which are aligned with the apertures in the ceramic layer. In another embodiment of this invention the apertures in the fibrous glass mat are omitted. The apertures in the ceramic layer serve to admit sound waves into the fibrous glass mat where they are absorbed.

It is, therefore, the primary object of this invention to provide a ceramic tile member which deadens sound.

It is another object of this invention to provide a sound-insulating ceramic tile member which may be easily and quickly mounted on a surface.

It is a further object of this invention to provide a sound-insulating member in which the principal constituent is a fibrous glass mat.

It is an additional object of this invention to provide a ceramic sound-insulating member wherein the ceramic layer has a number of holes therein and a fibrous glass filler underneath the ceramic layer to absorb sound waves.

Other objects and advantages of this invention will become readily apparent in view of the following description taken in conjunction with the accompanying drawings, wherein.

Figure 1:
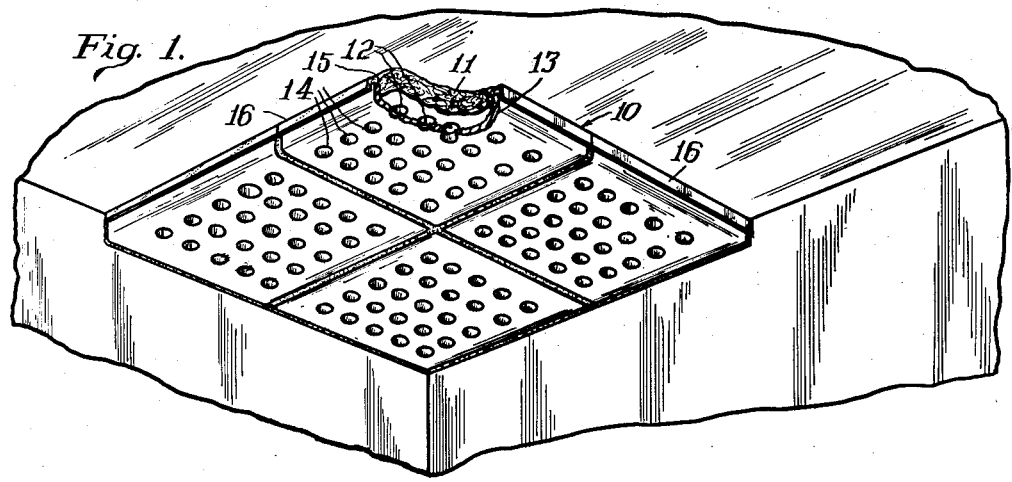
FIGURE 1 is a perspective view of several ceramic tile members of the invention as installed upon a ceiling, with a portion of the foremost ceramic tile member removed in order to show the fibrous glass mat underneath.

Returning to the drawings, more particularly to FIGURE 1 wherein like reference characters indicate the same parts throughout the various views, 10 indicates generally a sound-deadening ceramic tile member constructed in accordance with this invention. The components of the ceramic tile member 10 are shown in greater detail in the sectional view illustrated in FIGURE 2. As may be seen in FIGURE 2, the ceramic tile member 10 comprises a fibrous glass mat 11, which has a plurality of apertures 12 therethrough. The fibrous glass mat 11 is comprised of a quantity of glass fibers which are impregnated with a binding agent and then shaped into the form desired. A polyester resin is one binding agent which may be employed. Upon one surface of the fibrous glass mat 11 there is a ceramic layer 13. The ceramic layer 13 may be made of the usual ceramic constituents of such tiles, as, for example, a mixture of shales, clays, or clay with or without coloring oxides. The ceramic layer 13 is preferably made of a glazed or vitrified ceramic material similarly as fired clay products, consequently the outer surface of the ceramic layer 13 presents a glazed, smooth surface such as illustrated in FIGURE 1. The ceramic layer 13 has a plurality of apertures 14 therein. These apertures 14 are arranged in any suitable pattern in the ceramic layer 13. The apertures 14 serve to admit the sound waves into the fibrous glass mat 11, where the sound waves may then be absorbed. While the apertures 14 are shown in FIGURE 1 as being arranged in a symmetrical square pattern, it is to be understood that any desired pattern may be employed.

The ceramic layer 13 has a lip portion 15 about its peripheral edges and the lip portion 15 is turned inwardly toward the under surface of the ceramic layer 13. By turning a portion of the ceramic layer inwardly a greater surface of the ceramic layer is presented to the fibrous glass mat so that a stronger bond may be obtained between the fibrous glass mat 11 and the ceramic layer 13. It is preferred that in the construction of the ceramic tile member of this invention the ceramic layer 13 interlock with glass fibers on the outer surface of the glass mat 11. In this way fibrous glass mat 11 serves to reinforce the ceramic layer 13, and will give the ceramic tile member additional strength. A portion of the fibrous glass mat 11 is in engagement with the outer surface of the peripheral lip portion 15 of the ceramic layer 13. This portion of the glass mat is indicated as 16, and extends completely around the periphery of the ceramic layer 13. When a plurality of ceramic tile members 10 is assembled upon a surface, the abutting of these fibrous glass portions 16 presents an additional fibrous glass surface which may absorb sound waves. As mentioned above, it is desirable that the ceramic portions of the tile members 10 not be in engagement with each other, because of the fact that a ceramic has poor sound-absorbing qualities.

Figure 2:
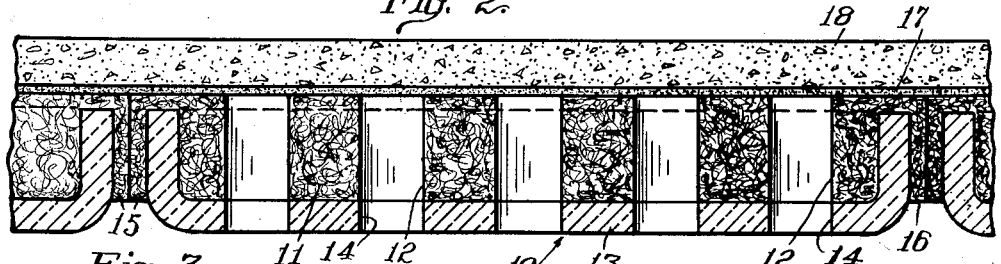
FIGURE 2 is a sectional view taken along the lines 2—2 in FIGURE 4 wherein the embodiment of the invention has a fibrous glass mat which is apertured.

Indicated at 17 is a bond which secures the ceramic tile member 10 to the ceiling 18. The bond 17 may be either an adhesive backing applied to each individual tile member, or the bond may be applied to the entire surface immediately prior to installation of the ceramic tile members. By way of example this bond may be a suitable mastic or pressure-sensitive cement. For the purposes of this disclosure, the ceramic tile members 10 are illustrated as being installed upon a ceiling. However, it is understood that these ceramic tile members are not limited to use on ceilings, but may be mounted upon any wall or, if desired, upon the floor. While the ceiling 18 in FIGURE 2 is indicated as being of concrete it should also be understood that the ceramic tile members of this invention may just as easily be installed upon surfaces of other materials.

Figure 3:
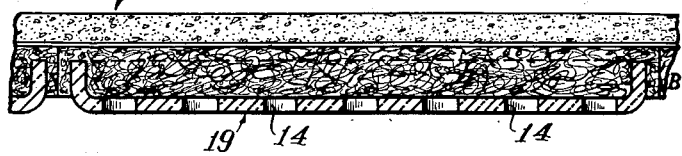
FIGURE 3 is a sectional view similar to sectional view in FIGURE 2 but disclosing an embodiment of the invention as comprising a fibrous glass mat without any openings therein.

Turning now to FIGURE 3 there is disclosed therein a sectional view of a tile member 19. The tile member 19 is basically similar to tile member 10 of FIGURE 2 except for the fact that the fibrous glass mat 11 is of solid construction, that is there are no apertures in the glass mat 11. With this construction of the ceramic tile member, the apertures 14 in the ceramic layer 13 open directly to the fibrous glass mat 11. As the ceramic tile members illustrated in FIGURES 2 and 3 are essentially the same, the election of which to use is basically a matter of choice.

Figure 4:
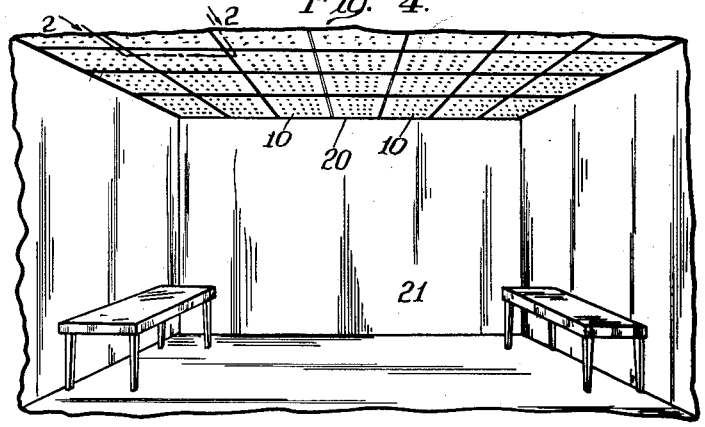
FIGURE 4 is a perspective view showing a ceiling upon which has been installed an insulating surface comprising the ceramic tile members of this invention.

When a plurality of the ceramic tile members of this invention is installed, the result is a surface having the appearance of the ceiling 20 disclosed in FIGURE 4. The sound-insulating ceiling 20 disclosed in FIGURE 4 is illustrated as being made up of ceramic tile members 10. It is understood, however, that the ceramic tile member 19 disclosed in FIGURE 3 may be employed instead and virtually identical sound-proofing characteristics will result. While FIGURE 4 discloses the use of these ceramic tile members upon the ceiling of a room, this particular sound-insulating structure may be readily employed upon the surrounding walls and the floor of the room 21 illustrated in FIGURE 4.

Thus it can be seen by applying a mat of fibrous glass beneath an apertured ceramic layer it is possible to have a ceramic surface which deadens sound. As fibrous glass has been found to be a good sound-insulator, it will readily be apparent that a ceramic tile constructed in accordance with this invention will have considerably greater sound-insulating qualities than the conventional ceramic tile. In addition, the ceramic tile member of this invention may be easily and cheaply installed upon virtually any type of surface. As a result of this invention, it is now feasible to soundproof rooms which previously were held to be incapable of being suitably soundproofed.

It will further be understood that various other modifications, changes and substitutions of equivalents may be made in the construction and arrangement of the sound-deadening tiles which are within the scope of the invention as defined in the appended claims.

What is claimed as this invention is:

1. A sound-insulating member comprising a ceramic tile having a rigid generally flat body portion, a peripheral lip on said body portion turned inwardly toward the under surface thereof, a plurality of apertures in said body portion, and a sound absorbing fibrous glass mat interlocked with the under surface of said ceramic tile, and a portion of said mat in engagement with the exterior surface of said turned peripheral lip.

2. A sound-insulating member comprising a ceramic tile having a rigid generally flat body portion, a lip portion adjacent the peripheral edges thereof and turned inwardly toward the under surface thereof, a plurality of apertures in said body portion, a sound absorbing member comprising a fibrous glass mat secured to the under surface of said ceramic tile, a portion of said mat in engagement with the outer surface of said tile lip portion, and a plurality of apertures in said fibrous glass mat aligned with said apertures in said ceramic tile.

3. A sound-insulating member comprising a ceramic tile having a rigid generally flat body portion, a lip portion adjacent the peripheral edges thereof and turned inwardly toward the under surface thereof, a plurality of spaced apertures in said body portion, a sound absorbing member comprising a glass fiber mat having one face thereof interlocked with the under surface of said ceramic tile, said glass fiber mat having a peripheral lip portion engaging the outer surface of the lip portion of said body portion, a plurality of apertures in said glass fiber mat aligned with the apertures in said body portion, and an adhesive backing on the other face of said glass fiber mat.

4. A sound-insulating surface comprising a plurality of ceramic tile members bonded to a building surface in adjoining relationship, each said member comprising a glass fiber sound absorbing mat, an adhesive coating on one face of said mat, a ceramic layer on the other face of said mat, portions at said mat in engagement with the remote face of said layer, a plurality of apertures in said ceramic layer, and a plurality of apertures in said glass fiber mat aligned with the apertures in said ceramic layer.

5. A sound insulating member comprising a sound insulating mat, an outer ceramic layer thereon, the edges of said layer turned toward said sound insulating mat, and a portion of said mat being in engagement with the outer surfaces of said turned edges so that a sound absorbing surface is formed around the outer edge of each sound insulating member.

6. A sound insulating surface comprising a plurality of ceramic tile members secured to a surface, each said member comprising a mat of sound insulating material, an outer ceramic layer thereon, the peripheral edges of said layer bent toward said sound insulating mat, and a portion of said mat in engagement with the outer surface of the turned edges whereby adjoining tiles are in contact along said mat portions only so that additional sound absorbing surfaces are formed between said tile members,

References Cited in the file of this patent

UNITED STATES PATENTS

| | | |
|---|---|---|
| 1,899,403 | Venzie | Feb. 28, 1933 |
| 1,916,136 | Grigsby | June 27, 1933 |
| 1,946,914 | New | Feb. 13, 1934 |
| 1,978,632 | Hoff et al. | Oct. 30, 1934 |
| 1,992,509 | Slidell | Feb. 26, 1935 |
| 2,014,749 | Smith | Sept. 17, 1935 |
| 2,021,359 | Halstead | Nov. 19, 1935 |
| 2,049,427 | Denk | Aug. 4, 1936 |
| 2,114,546 | Slayter | Apr. 19, 1938 |
| 2,186,511 | Welch | Jan. 9, 1940 |
| 2,271,871 | Newport et al. | Feb. 3, 1942 |
| 2,307,332 | Parsons | Jan. 5, 1943 |
| 2,404,904 | Collins | July 30, 1946 |
| 2,459,121 | Willey et al. | Jan. 11, 1949 |
| 2,562,711 | Gessler et al. | July 31, 1951 |
| 2,637,995 | Mann | May 12, 1953 |
| 2,668,123 | Copeland | Feb. 2, 1954 |
| 2,694,233 | Page | Nov. 16, 1954 |
| 2,760,881 | Toulmin | Aug. 28, 1956 |

FOREIGN PATENTS

| | | |
|---|---|---|
| 419,226 | Italy | 1947 |
| 599,579 | Great Britain | 1948 |